US009994674B2

(12) United States Patent
Raether

(10) Patent No.: US 9,994,674 B2
(45) Date of Patent: Jun. 12, 2018

(54) POLYMERS BASED ON GLYCEROL CARBONATE

(75) Inventor: Roman Benedikt Raether, Speyer (DE)

(73) Assignee: BASF SE (DE)

( * ) Notice: Subject to any disclaimer, the term of this patent is extended or adjusted under 35 U.S.C. 154(b) by 301 days.

(21) Appl. No.: 13/397,879

(22) Filed: Feb. 16, 2012

(65) Prior Publication Data
US 2012/0215030 A1    Aug. 23, 2012

Related U.S. Application Data

(60) Provisional application No. 61/445,074, filed on Feb. 22, 2011.

(51) Int. Cl.
  *C07C 43/10* (2006.01)
  *C08G 64/30* (2006.01)
  *C08G 65/26* (2006.01)
(52) U.S. Cl.
  CPC ........... *C08G 64/302* (2013.01); *C08G 64/30* (2013.01); *C08G 65/2603* (2013.01)
(58) Field of Classification Search
  CPC ..... C07C 41/03; C07C 43/10; C08G 65/2609; C08G 65/2696
  USPC ........................................ 568/618, 623, 624
  See application file for complete search history.

(56) References Cited

U.S. PATENT DOCUMENTS

| | | | | |
|---|---|---|---|---|
| 3,324,070 | A | * | 6/1967 | Hostettler ............... C08G 63/64 524/199 |
| 4,298,764 | A | | 11/1981 | Berkowitz |
| 4,906,673 | A | * | 3/1990 | Mori .................. C08G 18/4063 521/131 |
| 5,041,688 | A | | 8/1991 | Jakobson et al. |
| 6,211,286 | B1 | | 4/2001 | Schafheutle et al. |
| 2007/0165152 | A1 | | 7/2007 | Suzuki et al. |
| 2010/0144978 | A1 | | 6/2010 | Bevinakatti et al. |
| 2010/0184871 | A1 | * | 7/2010 | Bevinakatti et al. ......... 514/785 |
| 2012/0123104 | A1 | * | 5/2012 | Andjelic et al. ............. 536/18.2 |
| 2012/0215020 | A1 | | 8/2012 | Raether et al. |
| 2012/0215030 | A1 | | 8/2012 | Raether |
| 2012/0215032 | A1 | | 8/2012 | Raether et al. |
| 2012/0294813 | A1 | | 11/2012 | Frey et al. |

FOREIGN PATENT DOCUMENTS

| | | |
|---|---|---|
| CN | 101392054 A | 3/2009 |
| DE | 43 35 947 A1 | 4/1995 |
| DE | 44 33 959 A1 | 3/1996 |
| DE | 19947631 A1 | 6/2000 |
| EP | 1785410 A1 | 5/2007 |
| JP | S6071634 A | 4/1985 |
| JP | S61140534 A | 6/1986 |
| JP | 07316503 A | 12/1995 |
| JP | H8157590 A | 6/1996 |
| JP | 11 335 313 A | 12/1999 |
| JP | 11335313 A | 12/1999 |
| JP | 2000 119 205 A | 4/2000 |
| JP | 2009155407 A | 7/2009 |
| JP | 2010006759 | * 1/2010 |
| JP | 201030835 A | 2/2010 |
| WO | WO-9511250 A1 | 4/1995 |
| WO | WO-200601483 A1 | 1/2006 |
| WO | WO2008142374 | * 11/2008 |
| WO | WO-2008142374 A1 | 11/2008 |
| WO | WO2009016375 | * 2/2009 |
| WO | WO-2010/012562 A1 | 2/2010 |
| WO | WO-2011072829 A1 | 6/2011 |

OTHER PUBLICATIONS

Tsuyoshi et al., machine generated translation of JP 2010-006759, Jan. 2010, 9 pages, submitted by Applicants on May 18, 2015.*
U.S. Appl. No. 61/445,068, filed Feb. 22, 2011, Raether et al.
U.S. Appl. No. 61/445,076, filed Feb. 22, 2011, Raether et al.
Rokicki et al., "Hyperbranched Aliphatic Polyethers Obtained from Environmentally Benign Monomer: Glycerol Carbonate", Green Chemistry, vol. 7, (2005), pp. 529-539.
Kihara et al., "Synthesis and Properties of Poly(Hydroxyurethane)s", Journal of Polymer Science: Part A: Polymer Chemistry, vol. 31, (1993), pp. 2765-2773.
Wilms, D., et al., "Hyperbranched PEG by Random Copolymerization of Ethylene Oxide and Glycidol", Macromolecular Rapid Communications, vol. 31, (2010), pp. 1811-1815.
International Search Report for PCT/EP2012/051607, dated May 7, 2012.
English Language Translation of Office Action in Chinese Patent Application No. 201280009450.6, dated 2015.
English Translation of Japanese Office Action for Japanese Application No. 2013-553861, dated Jun. 6, 2017.

* cited by examiner

*Primary Examiner* — Rosalynd A Keys
(74) *Attorney, Agent, or Firm* — Drinker Biddle & Reath LLP

(57) ABSTRACT

The present invention relates to a polymer and the associated polymerization process, and to the use of the polymers according to the invention for example as foam suppressant, for the dispersion of solids or as surfactant for washing or cleaning purposes. The polymer is prepared by polymerization of
  a) at least one alkylene oxide or a cyclic carbonate of the formula (I)

$$\underset{(CH_2)_n\ (R^1)_m}{\overset{O}{\underset{\|}{O\diagdown\hspace{-0.3em}\diagup O}}} \quad (I)$$

where
n is 1 to 10,
m is 0 to 3 and
$R^1$ is $C_1$-$C_{10}$-alkyl, $C_2$-$C_{10}$-alkenyl, aryl or aralkyl,
  b) glycerol carbonate,
where the polymerization is carried out in the presence of at least one base.

14 Claims, No Drawings

POLYMERS BASED ON GLYCEROL CARBONATE

This patent application claims the benefit of U.S. provisional patent application Ser. No. 61/445,074 filed Feb. 22, 2011 incorporated in its entirety herein by reference.

The present invention relates to a polymer and the associated polymerization process, and to the use of the polymers according to the invention for example as emulsifier, as foam regulator, as foam booster, as foam suppressant, for dispersing solids, as wetting agent for hard surfaces or as surfactant for washing or cleaning purposes. The polymers according to the invention are based on glycerol carbonate. The comonomer used is at least one alkylene oxide such as ethylene oxide or propylene oxide or a cyclic carbonate of the formula (I) defined below, such as ethylene carbonate or propylene carbonate. The polymerization is carried out in the presence of at least one base.

Glycerol carbonate is a basic chemical with a broad field of application. Thus, for example, it can react with anhydrides to form ester bonds or with isocyanates to form urethane bonds. Furthermore, glycerol carbonate is used as a solvent in cosmetics or in medicine. On account of its low toxicity, its low evaporation rate, its low flammability and its moisturizing properties, glycerol carbonate is suitable as a wetting agent of cosmetic materials or as carrier solvent for medically effective substances. Furthermore, glycerol carbonate can also be used as a starting material in polymer preparation. Alternatively to glycerol carbonate, epichlorohydrin, glycidol or glycerol can also be used during polymer preparation, it being possible for the oligomer or polymer structures prepared thereby to be varied depending on these glycerol derivatives used as starting material.

U.S. Pat. No. 5,041,688 relates to a process for the preparation of polyglycerols which have a low fraction of cyclic products, where glycerol is reacted with epichlorohydrin in the presence of an acid such as phosphoric acid and a subsequent esterification with longer-chain carboxylic acids is carried out.

Problems with the polymerization process described above, however, are the low degree of condensation, the broad molecular weight distribution and the black, tar-like consistency of the product, which is caused by high thermal stresses during the condensation of the glycerol.

These problems were able to be overcome at least partially by using glycidol as in DE-A 199 47 631 and EP-A 1785410 instead of glycerol or epichlorohydrin. On the other hand, on account of its carcinogenic properties and its high lability, the use of glycidol is associated with additional problems.

DE-A 199 47 631 relates to a process for the preparation of polyols based on glycidol having a degree of polymerization of from 1 to 300, a polydispersity of <1.7 and a content of branched units of up to ca. 30% (determined by $^{13}$C-NMR spectroscopy). In the associated process, a solution, comprising glycidol in dilute form, is reacted with a hydrogen-active starter compound with basic catalysis. A further process for the preparation of polymers based on glycidol is described in U.S. Pat. No. 4,298,764, by means of which it is possible to prepare long-chain n-alkyl glyceryl ether alcohols with an n-alkyl chain length of from 10 to 20.

EP-A 1 785 410 relates to unbranched polyglycerol monoethers which are prepared by basic catalysis from an alcohol having up to 30 carbon atoms and glycidol. The polyglycerol monoethers prepared in the process have at least two fragments which are based on glycerol and/or glycidol building blocks. The polyglycerol monoether has a monoether fraction of at least 75% and a diether fraction of at most 5%, the particular fractions being determined by means of reverse-phase high-performance liquid chromatography (RP-HPLC).

As an alternative to the glycidol starting material, glycerol carbonate (4-(hydroxymethyl)-1,3-dioxolan-2-one), which is readily accessible from glycerol, has been proposed for the synthesis of oligoglycerols via a base-catalyzed polymerization. For example, G. Rokicki et al., Green Chemistry, 2005, 7, pages 529 to 539 discloses a process for the preparation of hyperbranched aliphatic polyethers which are obtainable using glycerol carbonate as monomers. The hyperbranched aliphatic polyethers moreover have terminal units with two primary hydroxy groups. The ring-opening polymerization of glycerol carbonate is carried out with base catalysis using alkoxides.

Analogous processes for the preparation of amphiphilic glycerol or polyglycerol monoalkyl ethers using glycerol carbonate as starting material are described in JP-A 2000 119 205 or JP-A 11 335 313. In some cases, long-chain starter alcohols with alkyl radicals of up to 24 carbon atoms can also be used.

WO 2010/012562 relates to a catalytic process for the polymerization of cyclic carbonates which are obtained from renewable sources. The ring size of the cyclic carbonates is between 5 and 7 atoms, where a ring-opening polymerization is carried out in the presence of a system comprising a metal salt such as triflate and an alcohol. Glycerol carbonate can also be used as cyclic carbonate. The polymers obtained in the process have carbonic acid ester building blocks, i.e. the polymerization takes place without the elimination of $CO_2$ since it is carried out in the presence of the metal salt, which acts as acidic catalyst.

DE-A 44 33 959 relates to a foaming detergent mixture with an improved foaming behavior which comprises alkyl and alkylene oligoglycoside glycerol ethers and also anionic, nonionic, cationic and/or amphoteric or zwitterionic surfactants. The alkyl and/or alkenyl oligoglycoside glycerol ethers present in the detergent mixtures are produced by etherifying alkyl and/or alkenyl oligoglycosides with glycerol glycine, glycerol carbonate or directly with glycerol and/or technical-grade oligoglycerol mixtures. Analogous alkyl and/or alkenyl oligoglycoside glycerol ethers are disclosed in DE-A 43 35 947.

N. Kihara et al. (Journal of Polymer Science: Part A: Polymer Chemistry, volume 31 (1993); pages 2765-2773) disclose a preparation process for polyhydroxyurethanes with a molecular weight $M_n$ of from 20 000 to 30 000, where compounds which have two cyclic carbonate fragments are reacted with diamines such as hexamethylenediamine at 70 to 100° C. over 24 h via a polyaddition. It is also described that cyclic carbonates with a ring size of 5 can be reacted easily at room temperature with primary aliphatic amines to give 2-hydroxyethylurethanes. The corresponding reactions of the cyclic carbonates with alcohols or carboxylic acids, and the aminolysis of the esters, however, do not take place under these reaction conditions.

The simultaneous use of glycerol carbonate and a comonomer, comprising alkylene oxide and/or a cyclic carbonate different from glycerol carbonate, such as ethylene carbonate, for the preparation of polymers has not yet been described.

The object underlying the present invention is therefore to provide further polymers based on glycerol carbonate, and also an associated polymerization process. The object is achieved by the polymers according to the invention prepared by polymerization of a) at least one alkylene oxide or a cyclic carbonate of the formula (I)

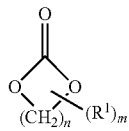

where
n is 1 to 10,
m is 0 to 3 and
$R^1$ is $C_1$-$C_{10}$-alkyl, $C_2$-$C_{10}$-alkenyl, aryl or aralkyl,
b) glycerol carbonate,
where the polymerization is carried out in the presence of at least one base.

The polymers according to the invention are characterized in that they can have both linear and branched structures. Depending on the polymerization conditions selected (e.g. temperature) and/or the monomers used (starting materials), polymers with different structures—for example different degrees of branching—and consequently variable application profiles can be prepared.

On account of using glycerol carbonate as monomer, the polymers according to the invention have an increased number of free OH functions. Each incorporated glycerol carbonate monomer brings about an additional potential linkage site in the polymer, by means of which the degree of branching can be controlled. As a result of the free OH functions, an increase in the water solubility, an improvement in salt compatibility (greater salt tolerance), and higher cloud points are achieved.

A further advantage is that, on account of the starting materials used and/or the polymerization conditions, polymers are prepared which have exclusively ether bonds and no ester bonds. The polymers according to the invention therefore have improved pH stability compared with conventional polymers in which the hydrophobic moiety and the hydrophilic moiety of the amphiphilic molecule or polymers are linked together via an ester bond. Depending on the choice of monomers, the polymers according to the invention can be amphiphilic, hydrophilic or hydrophobic.

The use of glycerol carbonate instead of glycidol as monomer during the polymerization is, moreover, associated with the advantage that glycerol carbonate is an easy-to-handle and nontoxic compound which can be readily polymerized with the elimination of $CO_2$. In contrast to this, glycidol (as already described above) is a very hazardous substance which is toxic and expensive and for which, moreover, official operating approval is required in many countries. Furthermore, no protective groups are required when using glycerol carbonate. Moreover, the degree of branching of the polymers according to the invention can be controlled easily through the use of glycerol carbonate, as a result of which a multitude of polymers with different intended uses can be prepared.

Within the context of the present invention, definitions such as $C_1$-$C_{10}$-alkyl, as for example defined above for the radical $R^1$ in formula (I), mean that this substituent (radical) is an alkyl radical with a carbon atom number from 1 to 10. The alkyl radical may be linear or branched and also optionally cyclic. Alkyl radicals which have both a cyclic component and also a linear component likewise fall under this definition. The same is also true for other alkyl radicals, such as for example a $C_1$-$C_3$-alkyl radical or a $C_1$-$C_{30}$-alkyl radical. The alkyl radicals can optionally also be mono- or polysubstituted with functional groups such as amino, amido, ether, vinyl ether, isoprenyl, hydroxy, mercapto, carboxyl, halogen, aryl or heteroaryl. Unless stated otherwise, the alkyl radicals preferably have no functional groups as substituents. Examples of alkyl radicals are methyl, ethyl, n-propyl, sec-propyl, n-butyl, sec-butyl, isobutyl, 2-ethylhexyl, tertiary-butyl (tert-bu/t-Bu), pentyl, hexyl, heptyl, cyclohexyl, octyl, nonyl or decyl.

Within the context of the present invention, definitions such as $C_2$-$C_{10}$-alkenyl, as for example defined above for the radical $R^1$ in formula (I), mean that this substituent (radical) is an alkenyl radical with a carbon atom number from 2 to 10. This carbon radical is preferably monounsaturated, but it can optionally also be di- or polyunsaturated. As regards linearity, branches, cyclic fractions and optionally present substituents, the analogous details as defined above with reference to the $C_1$-$C_{10}$-alkyl radicals are applicable. Preferably, within the context of the present invention, $C_2$-$C_{10}$-alkenyl is vinyl, 1-allyl, 3-allyl, 2-allyl, cis- or trans-2-butenyl, ω-butenyl.

Within the context of the present invention, the term "aryl", as for example defined above for the radical $R^1$ in formula (I), means that the substituent (radical) is an aromatic. The aromatic may be a monocyclic, bicyclic or optionally polycyclic aromatic. In the case of polycyclic aromatics, individual cycles can optionally be completely or partially saturated. Preferred examples of aryl are phenyl, naphthyl or anthracyl, in particular phenyl. The aryl radical can also optionally be mono- or polysubstituted with functional groups, as defined above for $C_1$-$C_{10}$-alkyl.

Within the context of the present invention, the term aralkyl, as for example defined above for the radical $R^1$ in formula (I), means that an alkyl radical (alkylene) is in turn substituted with an aryl radical. The alkyl radical may be for example a $C_1$-$C_{10}$-alkyl radical as per the above definitions.

In the above formula (I), the radical $R^1$ may be present once (m=1) or multiple times (m=2 or 3). The radical $R^1$ here can replace one or more hydrogen atoms on any desired carbon atoms of the cyclic carbonate—corresponding to its frequency. If two or more radicals $R^1$ are present, these can be attached to the same carbon atom or to different carbon atoms. For m=0, the corresponding cyclic carbonate is unsubstituted.

The present invention is presented in more detail below.

The present invention firstly provides a polymer prepared by polymerization of
a) at least one alkylene oxide or a cyclic carbonate of the formula (I)

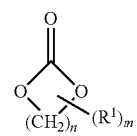

where
n is 1 to 10,
m is 0 to 3 and
$R^1$ is $C_1$-$C_{10}$-alkyl, $C_2$-$C_{10}$-alkenyl, aryl or aralkyl,
b) glycerol carbonate,
where the polymerization is carried out in the presence of at least one base.

The polymers according to the invention are thus prepared by polymerization of the components a) and b) defined above in the presence of water and/or at least one base. Polymerization processes per se are known to the person skilled in the art, they are defined in more detail in the text below with regard to the polymerization process according to the invention.

As component a), at least one alkylene oxide or a cyclic carbonate of the formula (I) defined above is used. As component a), mixtures of 2 or more alkylene oxides and/or cyclic carbonates according to formula (I) can also be used. Preferably, the component a) comprises an alkylene oxide or a cyclic carbonate according to formula (I).

Alkylene oxides per se and also compounds which fall under the formula (I), are known in principle to the person skilled in the art. If present, the radical $R^1$ according to formula (I) is preferably unsubstituted, in particular unsubstituted $C_1$-$C_{10}$-alkyl. $R^1$ is particularly preferably methyl, ethyl or propyl. Preferably, m is 0 or 1, in particular m is 0. Preferably, n is 2 or 3.

Preferably, the component a) is an alkylene oxide which comprises a monomer which is selected from ethylene oxide, propylene oxide, 1-butene oxide, 2-butene oxide, 1-pentene oxide, styrene oxide, epichlorohydrin, glycidol, epoxypropionic acid and salts thereof, epoxypropionic acid alkyl esters, 1-hexene oxide, 1-heptene oxide, 1-octene oxide, 1-nonene oxide, 1-decene oxide, 1-undecene oxide or 1-dodecene oxide. Furthermore, it is preferred that the component a) is a cyclic carbonate of the formula (I) selected from ethylene carbonate or propylene carbonate. Examples of alkyl epoxypropionates are the corresponding methyl or ethyl esters and also higher esters.

The component a) is particularly preferably at least one alkylene oxide, in particular ethylene oxide and/or propylene oxide.

Glycerol carbonate is used as component b). Glycerol carbonate and processes for its preparation are known to the person skilled in the art. Preferably, glycerol carbonate is prepared from glycerol.

The components a) and b) may be used in any desired ratios relative to one another. For example, the component b) is used to 0.5 to 99.5% by weight, preferably to 2 to 98% by weight (based on the total amount of component a) and b)).

The polymers according to the invention can be prepared by polymerization processes known to the person skilled in the art, where the polymerization is carried out in the presence of at least one base. Preferably, the polymerization takes place as base-initiated polyaddition. The base is therefore used as initiator. The polymerization process per se for the preparation of the polymers according to the invention is described in more detail in the text below.

Bases suitable for polymerization processes are known to the person skilled in the art, for example alkali metals, alkali metal hydrides, alkali metal hydroxides, alkali metal alcoholates or alkaline earth metals, alkaline earth metal hydrides, alkaline earth metal hydroxides or alkaline earth metal alcoholates and also tertiary and heteroaromatic amines can be used for this purpose.

All compounds known to the person skilled in the art can be used as alkali metal hydroxide or as alkaline earth metal hydroxide. Preferred alkali metal hydroxides are sodium hydroxide, potassium hydroxide or cesium hydroxide, preferred alkaline earth metal hydroxides are magnesium hydroxide or calcium hydroxide, preferred alkali metal alcoholates are sodium methanolate, sodium t-butylate and potassium methanolate, and also potassium t-butylate. Preferred amines are trimethylamine, N,N-dimethylethanolamine and other N,N-dimethyl substituted tertiary amines, or imidazole and its derivatives.

Preferred bases are selected from KOH, $KOCH_3$, KO(t-Bu), KH, NaOH, NaO(t-Bu), $NaOCH_3$, NaH, Na, K, trimethylamine, N,N-dimethylethanolamine, N,N-dimethylcyclohexylamine and higher N,N-dimethylalkylamines, N,N-dimethylaniline, N,N-dimethylbenzylamine, N,N,N'N'-tetramethylethylenediamine, N,N,N',N'',N''-pentamethyldiethylenetriamine, imidazole, N-methylimidazole, 2-methylimidazole, 2,2-dimethylimidazole, 4-methylimidazole, 2,4,5-trimethylimidazole and 2-ethyl-4-methylimidazole. Higher N,N-dimethylalkylamines are understood as meaning all amines whose alkyl substituent has more than 6 carbon atoms.

Particularly preferred bases are KO (t-Bu) (where t-Bu is the radical tertiary-butyl), KOH or NaOH.

The base is preferably used in amounts of from 0.05% by weight to 20% by weight, the base preferably being used in an amount of from 0.1 to 10% by weight, in particular from 0.1 to 1% by weight (in each case based on the amount of polymer (product)).

In a preferred embodiment of the present invention, the base is used in dissolved form. Solvents which can be used are all solvents known to the person skilled in the art in which the corresponding base dissolves. Preference is given to using water as solvent for the base, particularly in the case of alkali metal hydroxides. The base is preferably used in amounts of from 40 to 60% by weight (based on the solvent of the base).

The polymer according to the invention is preferably a random copolymer, a block copolymer, a comb polymer, a multiblock copolymer or a gradient copolymer. This means that—depending on the polymerization conditions chosen— the monomers brought to polymerization (components a) and b) according to the definitions above) can be incorporated by polymerization in the polymer according to the invention in different ways.

Preferably, the polymer according to the invention comprises one or more fragments according to the following formulae (II) to (IV).

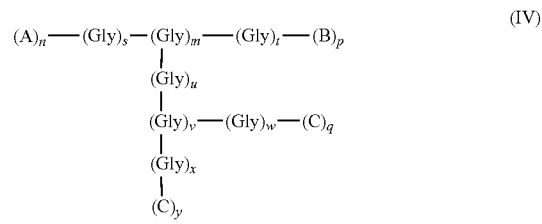

where A, B and C, independently of one another, are formed from the component a) and Gly is formed from the component b).

In the formula (II), n and m, independently of one another, have values between 1 and 1000 and p has values between 0 and 1000. If B is present, A and B are preferably formed from different monomers of the component a).

In the formula (III), n, m, p and q, independently of one another, have values between 1 and 1000.

In the formula (IV), n, m, p, v and y, independently of one another, have values between 1 and 1000 and q, s, t, u, w and x, independently of one another, have values between 0 and 1000.

For the sake of completeness, it is noted that the polymers according to the invention can also comprise two or more of the aforementioned fragments of the same formula. Thus, it is conceivable that a polymer according to the invention comprises two fragments of the formula (II) and one fragment of for example the formula (III). In the individual fragments, the variables such as A or B can have different meanings. The fragments of the formulae (II) to (IV) can be arranged for example as a random copolymer, block copolymer or other polymer arrangements as per the definition of the present invention. If, for example, ethylene oxide is used as component a) and glycerol carbonate is used as component b), the variables A and B in the formula (II) have the same meaning (polymerization products of ethylene oxide). Thus, for example, if the polymerization is carried out with ethylene oxide and propylene carbonate as two different components a), the variables A and B in formula (II), for example, have different meanings. One variable then stands for polymerized ethylene oxide, and the other variable for polymerized propylene carbonate.

Specific examples of fragments in the polymers according to the invention are also as follows:

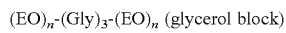
(EO)$_n$-(Gly)$_3$-(EO)$_n$ (glycerol block)

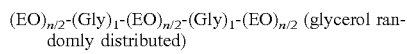
(EO)$_{n/2}$-(Gly)$_1$-(EO)$_{n/2}$-(Gly)$_1$-(EO)$_{n/2}$ (glycerol randomly distributed)

In these examples, EO means polymerized-in ethylene oxide and Gly means polymerized-in glycerol carbonate.

Preferred polymers, which comprise one or more fragments of the formula (II), are polymers based on ethylene oxide and propylene oxide or on ethylene carbonate and propylene carbonate as component a). Particular preference is given to polymers which comprise one or more fragments of the formula (II), or polymers based on ethylene oxide or ethylene carbonate as component (a). Very particular preference is given to polymers based on ethylene carbonate as component (a). These (co)polymers may be present preferably as random copolymers, block polymers, multiblock copolymers or gradient copolymers. Preferably, all of the components of a fragment according to the formula (II) are present in the same order of magnitude, i.e. the molar ratios of A, Gly and B are from ca. 1:0.5:0 via 1:1:1 to 0:0.5:1.

Preferred polymers, which comprise one or more fragments of the formula (III), are copolymers based on ethylene oxide and/or propylene oxide or ethylene carbonate and/or propylene carbonate, particularly preferably of ethylene oxide or ethylene carbonate, very particularly preferably of ethylene oxide, which have a relatively low fraction of units originating from glycerol carbonate. Preference is given here to block polymers, comb polymers or random polymers. An increased degree of branching of polymers comprising fragments of the formula (III) can be carried out via a further alkoxylation step.

Preferred polymers, which comprise one or more fragments according to the formula (IV), can be present as block-like or random polymers or comb or gradient polymers, preferably based on propylene oxide, ethylene oxide, propylene carbonate and/or ethylene carbonate. Polymers which comprise one or more fragments according to the formula (IV) can particularly preferably be present as block-like or random polymers or comb or gradient polymers, preferably based on ethylene oxide, and/or ethylene carbonate. Polymers which comprise one or more fragments according to the formula (IV) can very particularly preferably be present as block-like or random polymers or comb or gradient polymers, preferably based on ethylene oxide.

In one embodiment of the present invention, the polymer prepared according to the invention is obtainable by polymerization of a) at least one monomer selected from ethylene oxide, propylene oxide, ethylene carbonate and propylene carbonate, b) glycerol carbonate, where the polymerization is carried out in the presence of at least one base.

The base is preferably KO(t-Bu), KOH or NaOH.

The present invention further provides a process for the preparation of a polymer according to the definitions above. In the process according to the invention, the components a) and b) are subjected to a polymerization. The respective components a) and b) can be subjected to the polymerization individually or together and also in their entirety or stepwise.

The process according to the invention is carried out in temperature ranges for polymerization processes known to the person skilled in the art, preferably at elevated temperature, for example at 80 to 220° C.

The process according to the invention is carried out in the case of reacting cyclic carbonates (as component a)) preferably at elevated temperature, more preferably at 150 to 220° C., particularly preferably at 160 to 210° C.

The process according to the invention is carried out in the case of reacting alkylene oxides (as component a)) preferably at elevated temperature, more preferably at 80° to 220° C., particularly preferably at 120° C. to 205° C.

The process according to the invention can also be carried out in the presence of a solvent. Solvents which can be used are all solvents for carrying out polymerization processes that are known to the person skilled in the art. Preferred solvents are toluene, xylene, tetrahydrofuran (THF) or dioxane. Preferably, the solvent is used in amounts of from 20 to 90% by weight, in particular from 30 to 70% by weight based on the total amount of components a) to b).

Preferably, in the process according to the invention, the polymerization is carried out as base-initiated polyaddition and/or with the release of $CO_2$.

Furthermore, it is preferred in the process according to the invention to remove, in particular to completely remove, any water present in the system. The water can be removed for example by distillation. Preferably, the water is removed before the polymerization. The water to be removed is preferably water which is used as solvent for the base.

The present invention further provides the use of the polymers according to the invention as defined above as foam suppressant; as foam regulator; as foam booster; as dispersant; as emulsifier, in particular in emulsion polymerization; as wetting agent, in particular for hard surfaces; as lubricant; for dispersing solids, in particular for cement for thinning concrete; for thickening aqueous solutions; as carrier or filling material for pharmaceutical preparations; as surfactant for washing or cleaning purposes; as surfactant for the cleaning of hard surfaces; as humectant; in cosmetic, pharmaceutical or crop protection formulations; as adjuvant or solubilizer for active ingredients; in paints; in inks; in pigment preparations; in coating compositions; in adhesives; in leather degreasing compositions; in formulations for the textile industry, fiber processing, water treatment or the production of drinking water; in the food industry; the paper industry; as construction auxiliaries; as di- or polyol for the preparation of polyadducts or polymers such as polyesters; as coolant and lubricant; for fermentation; in mineral processing or metal processing, such as metal refining or electroplating sector.

The present invention is illustrated below by reference to the examples.

Example 1 g of 50% strength aqueous potassium hydroxide solution are introduced in a reactor as initial charge and rendered inert three times with nitrogen, then heated to 170° C. under nitrogen (pre-pressure of 5 bar) and stirring. 66 g of ethylene oxide and 60.3 g of glycerol carbonate are then metered in simultaneously over the course of 120 minutes and the mixture is held at 170° C. for a further 18 hours. The reaction solution is then flushed with nitrogen and degassed at 80° C. and under a water-jet vacuum for 2 h. This gives a clear, slightly viscous liquid which, in the infrared (IR), does not show any signals which suggest the presence of carbonyl groups. The weight-average molecular weight of the resulting polymer is 1400 g/mol (GPC, polystyrene standard).

I claim:

1. A polymer prepared by a process of polymerization of monomers, the monomers consisting of
    a) at least one alkylene oxide, and
    b) glycerol carbonate,
    wherein the polymerization is carried out in the presence of at least one base with the release of $CO_2$, and the polymer has no ester bonds, wherein the component a) comprises as alkylene oxide a monomer selected from the group consisting of styrene oxide, epichlorohydrin, glycidol, 1-nonene oxide, 1-decene oxide, 1-undecene oxide, and 1-dodecene oxide.

2. The polymer according to claim 1, wherein the polymerization is carried out as base-initiated polyaddition or a base selected from the group consisting of KOH, $KOCH_3$, KO(t-Bu), KH, NaOH, NaO(t-Bu), $NaOCH_3$, NaH, Na, K, trimethylamine, N,N-dimethylethanolamine, N,N-dimethylcyclohexylamine and higher N,Ndimethylalkylamines, N,N-dimethylaniline, N,N-dimethylbenzylamine, N,N,NN-tetramethylethylenediamine, N,N,N',N'',N''-pentamethyldiethylenetriamine, imidazole, N-methylimidazole, 2-methylimidazole, 2,2-dimethylimidazole, 4-methylimidazole, 2,4,5-trimethylimidazole and 2-ethyl-4-methylimidazole.

3. The polymer according to claim 2, wherein the base is used in amounts of from 0.05 to 20% by weight (based on the amount of polymer).

4. The polymer according to claim 1, wherein the polymer is a random copolymer, a block copolymer, a comb polymer, a multiblock copolymer or a gradient copolymer.

5. The polymer according to claim 1, wherein the polymer comprises one or more fragments according to the formulae (II) to (IV)

(II)

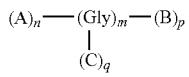

(III)

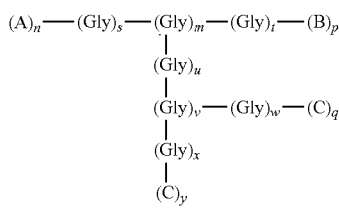

(IV)

where A, B and C, independently of one another, are formed from the component a), Gly is formed from the component b),
    where, in the formula (II), n and m, independently of one another, have values between 1 and 1000 and p has values between 0 and 1000,
    where, in the formula (III), n, m, p and q, independently of one another, have values between 1 and 1000,
    where, in the formula (IV), n, m, p, v and y, independently of one another, have values between 1 and 1000 and q, s, t, u, w and x, independently of one another, have values between 0 and 1000.

6. A material which comprises the polymer according to claim 1, wherein the material is a foam suppressant; a foam regulator; a foam booster; a dispersant; an emulsifier; a wetting agent; a lubricant; a process for dispersing solids; a thickener for thickening aqueous solutions; a carrier or filling material for pharmaceutical preparations; a surfactant for washing or cleaning purposes; a surfactant for the cleaning of hard surfaces; a humectant; a cosmetic formulation; a pharmaceutical formulation; a crop protection formulation; an adjuvant or solubilizer for active ingredients; a paint; an ink; a pigment preparation; a coating composition; an adhesive; a leather degreasing composition; a formulation for the textile industry, a fiber processing, a water treatment or the production of drinking water; a food industry composition; a paper industry composition; a construction auxiliary; a di- or polyol for the preparation of polyadducts or polymers; a coolant and lubricant; a fermentation composition; a mineral processing or metal processing composition.

7. The polymer according to claim 1, wherein the polymerization is carried out at 120° C. to 205° C.

8. A polymer prepared by polymerization of monomers consisting of components a) and b):
    a) at least a cyclic carbonate of the formula (I)

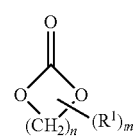

(I)

where
    n is 1 to 10,
    m is 0 to 3 and
    $R^1$ is $C_1$-$C_{10}$-alkyl, $C_2$-$C_{10}$-alkenyl, aryl or aralkyl,
    b) glycerol carbonate,
    wherein the polymerization is carried out in the presence of at least one base and with the release of $CO_2$, and wherein the polymer has no ester bonds.

9. The polymer according to claim 8, wherein the polymerization is carried out as base-initiated polyaddition or a base selected from the group consisting of KOH, $KOCH_3$, KO(t-Bu), KH, NaOH, NaO(t-Bu), $NaOCH_3$, NaH, Na, K, trimethylamine, N,N-dimethylethanolamine, N,N-dimethylcyclohexylamine and higher N,Ndimethylalkylamines, N,N-dimethylaniline, N,N-dimethylbenzylamine, N,N,N'N'-tetramethylethylenediamine, N,N,N',N'',N''-pentamethyldiethylenetriamine, imidazole, N-methylimidazole, 2-methylimidazole, 2,2-dimethylimidazole, 4-methylimidazole, 2,4,5-trimethylimidazole and 2-ethyl-4-methylimidazole.

10. The polymer according to claim 9, wherein the base is used in amounts of from 0.05 to 20% by weight (based on the amount of polymer).

11. The polymer according to claim 8, wherein the polymer is a random copolymer, a block copolymer, a comb polymer, a multiblock copolymer or a gradient copolymer.

12. The polymer according to claim 8, wherein the polymer comprises one or more fragments according to the formulae (II) to (IV)

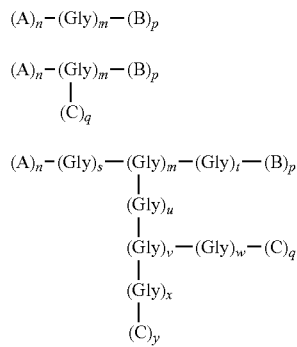

$$(A)_n-(Gly)_m-(B)_p \quad (II)$$

$$(A)_n-(Gly)_m-(B)_p \\ | \\ (C)_q \quad (III)$$

$$(A)_n-(Gly)_s-(Gly)_m-(Gly)_t-(B)_p \\ | \\ (Gly)_u \\ | \\ (Gly)_v-(Gly)_w-(C)_q \\ | \\ (Gly)_x \\ | \\ (C)_y \quad (IV)$$

where A, B and C, independently of one another, are formed from the component a), Gly is formed from the component b), where, in the formula (II), n and m, independently of one another, have values between 1 and 1000 and p has values between 0 and 1000, where, in the formula (III), n, m, p and q, independently of one another, have values between 1 and 1000, where, in the formula (IV), n, m, p, v and y, independently of one another, have values between 1 and 1000 and q, s, t, u, w and x, independently of one another, have values between 0 and 1000.

13. The polymer according to claim 1, wherein the base is selected from the group consisting of KH, NaH, Na, K, trimethylamine, N,N-dimethylethanolamine, N,N-dimethylcyclohexylamine, N,N-dimethylaniline, N,N-dimethylbenzylamine, N,N,N'N'-tetramethylethylenediamine, N,N,N',N'',N''-pentamethyldiethylenetriamine, imidazole, N-methylimidazole, 2-methylimidazole, 2,2-dimethylimidazole, 4-methylimidazole, 2,4,5-trimethylimidazole and 2-ethyl-4-methylimidazole.

14. The polymer according to claim 8, wherein the base is present from 0.05 to 20% by weight (based on the amount of polymer), the base is selected from the group consisting of KH, NaH, Na, K, trimethylamine, N,N-dimethylethanolamine, N,N-dimethylcyclohexylamine, N,N-dimethylaniline, N,N-dimethylbenzylamine, N,N,NN-tetramethylethylenediamine, N,N,N',N'',N''-pentamethyldiethylenetriamine, imidazole, N-methylimidazole, 2-methylimidazole, 2,2-dimethylimidazole, 4-methylimidazole, 2,4,5-trimethylimidazole and 2-ethyl-4-methylimidazole.

* * * * *